United States Patent
Hac et al.

(10) Patent No.: US 7,502,675 B2
(45) Date of Patent: Mar. 10, 2009

(54) FEEDFORWARD CONTROL OF MOTOR VEHICLE ROLL ANGLE

(75) Inventors: Aleksander B. Hac, Dayton, OH (US); Edward J. Bedner, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 613 days.

(21) Appl. No.: 11/018,260

(22) Filed: Dec. 21, 2004

(65) Prior Publication Data
US 2005/0222728 A1    Oct. 6, 2005

Related U.S. Application Data

(60) Provisional application No. 60/558,382, filed on Apr. 1, 2004.

(51) Int. Cl.
*G05B 11/36* (2006.01)
(52) U.S. Cl. .............................. 701/38; 701/70; 700/41; 700/43; 280/735
(58) Field of Classification Search .................. 701/70, 701/38; 180/408, 233; 700/41, 42, 43, 44, 700/40; 280/735; *G06F 19/00; B62D 5/04; G05B 11/36*
See application file for complete search history.

(56) References Cited

U.S. PATENT DOCUMENTS

| | | | |
|---|---|---|---|
| 4,094,479 A | | 6/1978 | Kennedy, Jr. |
| 4,441,151 A | * | 4/1984 | Hayashibe .................... 700/37 |
| 4,455,759 A | | 6/1984 | Coetsier |
| 4,666,013 A | | 5/1987 | Shibahata et al. |
| 4,723,444 A | | 2/1988 | Hajek |
| 4,754,391 A | * | 6/1988 | Suzuki ......................... 700/37 |
| 4,767,588 A | | 8/1988 | Ito |
| 4,840,389 A | | 6/1989 | Kawabe et al. |
| 4,842,089 A | | 6/1989 | Kimbrough et al. |
| 4,903,192 A | * | 2/1990 | Saito et al. .................... 700/37 |
| 4,961,595 A | | 10/1990 | Fukushima et al. |
| 5,040,115 A | | 8/1991 | Fukushima et al. |
| 5,173,224 A | * | 12/1992 | Nakamura et al. ......... 264/40.6 |
| 5,228,757 A | | 7/1993 | Ito et al. |
| 5,243,524 A | | 9/1993 | Ishida et al. |
| 5,272,621 A | * | 12/1993 | Aoki ............................ 700/45 |
| 5,448,481 A | | 9/1995 | Asanuma et al. |
| 5,480,219 A | | 1/1996 | Kost et al. |

(Continued)

FOREIGN PATENT DOCUMENTS

DE    19708159    9/1998

(Continued)

*Primary Examiner*—Tuan C To
(74) *Attorney, Agent, or Firm*—Thomas N. Twomey

(57) ABSTRACT

A technique for reducing excessive motor vehicle roll angle using a feedforward control comprises a number of steps. Initially, a steering angle and a speed of the-motor vehicle are determined. Next, a lateral acceleration of the vehicle is estimated based on the steering angle and the speed. Then, a lateral acceleration proportional and derivative (PD) term of the estimated lateral acceleration is determined and roll angle reduction is implemented when the lateral acceleration PD term exceeds a first threshold. The roll angle reduction may be achieved through application of a braking force to an outside front wheel of the vehicle. A magnitude of the braking force may be proportional to a difference between the lateral acceleration PD term and the first threshold.

25 Claims, 12 Drawing Sheets

U.S. PATENT DOCUMENTS

| | | | |
|---|---|---|---|
| 5,494,345 A | 2/1996 | Inagaki et al. | |
| 5,521,820 A | 5/1996 | Wakamatsu et al. | |
| 5,579,245 A | 11/1996 | Kato | |
| 5,598,304 A * | 1/1997 | Choi et al. | 360/78.04 |
| 5,606,502 A | 2/1997 | Adachi et al. | |
| 5,684,700 A | 11/1997 | Crocker | |
| 5,710,705 A | 1/1998 | Eckert | |
| 5,711,023 A | 1/1998 | Eckert et al. | |
| 5,747,683 A | 5/1998 | Gerum et al. | |
| 5,762,157 A | 6/1998 | Uehara | |
| 5,825,284 A | 10/1998 | Dunwoody et al. | |
| 5,859,774 A | 1/1999 | Kuzuya et al. | |
| 5,869,943 A | 2/1999 | Nakashima et al. | |
| 5,899,952 A | 5/1999 | Fukada | |
| 5,955,714 A | 9/1999 | Reneau | |
| 6,002,974 A | 12/1999 | Schiffmann | |
| 6,002,975 A | 12/1999 | Schiffmann et al. | |
| 6,038,495 A | 3/2000 | Schiffmann | |
| 6,055,472 A | 4/2000 | Breunig et al. | |
| 6,056,371 A | 5/2000 | Lin et al. | |
| 6,059,067 A | 5/2000 | Shibahata et al. | |
| 6,065,558 A | 5/2000 | Wielenga | |
| 6,070,952 A | 6/2000 | Tozu et al. | |
| 6,081,761 A | 6/2000 | Harada et al. | |
| 6,128,076 A | 10/2000 | Sackett | |
| 6,128,569 A | 10/2000 | Fukushima | |
| 6,161,905 A | 12/2000 | Hac et al. | |
| 6,176,555 B1 | 1/2001 | Semsey | |
| 6,178,368 B1 | 1/2001 | Otake | |
| 6,179,394 B1 | 1/2001 | Browalski et al. | |
| 6,192,305 B1 | 2/2001 | Schiffmann | |
| 6,202,488 B1 | 3/2001 | Cash | |
| 6,216,536 B1 | 4/2001 | Manseth | |
| 6,223,116 B1 | 4/2001 | Kin et al. | |
| 6,225,894 B1 | 5/2001 | Kyrtsos | |
| 6,226,587 B1 | 5/2001 | Tachihata et al. | |
| 6,233,513 B1 | 5/2001 | Furukawa et al. | |
| 6,253,123 B1 | 6/2001 | Schramm et al. | |
| 6,263,261 B1 | 7/2001 | Brown et al. | |
| 6,282,474 B1 | 8/2001 | Chou et al. | |
| 6,292,759 B1 | 9/2001 | Schiffmann | |
| 6,301,536 B1 | 10/2001 | Vaessen et al. | |
| 6,304,805 B1 | 10/2001 | Onogi | |
| 6,315,373 B1 | 11/2001 | Yamada et al. | |
| 6,324,446 B1 | 11/2001 | Brown et al. | |
| 6,324,447 B1 | 11/2001 | Schramm et al. | |
| 6,332,104 B1 | 12/2001 | Brown et al. | |
| 6,338,012 B2 | 1/2002 | Brown et al. | |
| 6,345,218 B1 | 2/2002 | Yamanaka et al. | |
| 6,349,247 B1 | 2/2002 | Schramm et al. | |
| 6,356,188 B1 | 3/2002 | Meyers et al. | |
| 6,363,309 B1 | 3/2002 | Irie et al. | |
| 6,397,127 B1 | 5/2002 | Meyers et al. | |
| 6,397,133 B1 | 5/2002 | van der Pol et al. | |
| 6,415,215 B1 | 7/2002 | Nishizaki et al. | |
| 6,424,907 B1 | 7/2002 | Rieth et al. | |
| 6,428,118 B1 | 8/2002 | Blosch | |
| 6,433,681 B1 | 8/2002 | Foo et al. | |
| 6,438,464 B1 | 8/2002 | Woywod et al. | |
| 6,453,226 B1 | 9/2002 | Hac et al. | |
| 6,456,920 B1 | 9/2002 | Nishio et al. | |
| 6,496,758 B2 | 12/2002 | Rhode et al. | |
| 6,496,759 B1 | 12/2002 | Mattes et al. | |
| 6,496,763 B2 | 12/2002 | Griessbach | |
| 6,502,014 B1 | 12/2002 | Herrmann et al. | |
| 6,502,023 B1 | 12/2002 | Fukada | |
| 6,505,108 B2 | 1/2003 | Bodie et al. | |
| 6,507,016 B1 | 1/2003 | Cooper | |
| 6,518,751 B1 | 2/2003 | Bujak | |
| 6,529,803 B2 | 3/2003 | Meyers et al. | |
| 6,529,811 B2 | 3/2003 | Watson et al. | |
| 6,535,800 B2 | 3/2003 | Wallner | |
| 6,542,073 B2 | 4/2003 | Yeh et al. | |
| 6,542,792 B2 | 4/2003 | Schubert et al. | |
| 6,546,324 B1 | 4/2003 | Chen et al. | |
| 6,553,293 B1 | 4/2003 | Hac | |
| 6,556,908 B1 | 4/2003 | Lu et al. | |
| 6,560,519 B2 | 5/2003 | Williams et al. | |
| 6,567,731 B2 | 5/2003 | Chandy | |
| 6,577,908 B1 * | 6/2003 | Wojsznis et al. | 700/42 |
| 6,584,388 B2 | 6/2003 | Schubert et al. | |
| 6,591,937 B2 * | 7/2003 | Badenoch et al. | 180/446 |
| 6,593,849 B2 | 7/2003 | Chubb et al. | |
| 6,600,414 B2 | 7/2003 | Foo et al. | |
| 6,604,035 B1 | 8/2003 | Wetzel et al. | |
| 6,618,656 B2 | 9/2003 | Kueblbeck et al. | |
| 6,622,073 B2 | 9/2003 | Tanaka et al. | |
| 6,631,317 B2 | 10/2003 | Lu et al. | |
| 6,654,671 B2 | 11/2003 | Schubert | |
| 6,654,674 B2 | 11/2003 | Lu et al. | |
| 6,662,898 B1 | 12/2003 | Mattson et al. | |
| 6,671,595 B2 | 12/2003 | Lu et al. | |
| 6,672,689 B1 | 1/2004 | Bauer | |
| 6,678,631 B2 | 1/2004 | Schiffmann | |
| 6,681,167 B2 | 1/2004 | Bender et al. | |
| 6,687,576 B2 | 2/2004 | Mattes et al. | |
| 6,691,549 B2 | 2/2004 | Froeschl et al. | |
| 6,697,726 B2 | 2/2004 | Takagi et al. | |
| 6,701,276 B2 | 3/2004 | Kueblbeck et al. | |
| 6,704,622 B2 | 3/2004 | Tinskey et al. | |
| 6,711,482 B2 | 3/2004 | Shiino et al. | |
| 6,714,851 B2 | 3/2004 | Hrovat et al. | |
| 6,718,248 B2 | 4/2004 | Lu et al. | |
| 6,719,087 B2 | 4/2004 | Demerly | |
| 6,725,135 B2 | 4/2004 | McKeown et al. | |
| 6,735,510 B2 | 5/2004 | Hac | |
| 6,741,922 B2 | 5/2004 | Holler | |
| 6,755,274 B2 | 6/2004 | Mattes et al. | |
| 6,757,595 B1 | 6/2004 | Bauer | |
| 6,782,315 B2 | 8/2004 | Lu et al. | |
| 6,796,397 B2 | 9/2004 | Lahmann et al. | |
| 6,799,092 B2 | 9/2004 | Lu et al. | |
| 6,804,584 B2 | 10/2004 | Tseng et al. | |
| 6,804,594 B1 | 10/2004 | Chen et al. | |
| 6,830,122 B2 | 12/2004 | Kroppe | |
| 6,968,261 B2 * | 11/2005 | Ghoneim et al. | 701/41 |
| 7,035,695 B2 * | 4/2006 | Boiko | 700/28 |
| 7,117,045 B2 * | 10/2006 | Hittle et al. | 700/48 |
| 2001/0003805 A1 | 6/2001 | Koibuchi | |
| 2002/0116105 A1 | 8/2002 | Chen et al. | |
| 2002/0147532 A1 | 10/2002 | Inagaki et al. | |
| 2002/0149161 A1 | 10/2002 | Smith | |
| 2002/0183911 A1 | 12/2002 | Tashiro et al. | |
| 2003/0047927 A1 | 3/2003 | Frimberger et al. | |
| 2003/0055547 A1 | 3/2003 | Chen et al. | |
| 2003/0055549 A1 | 3/2003 | Barta et al. | |
| 2003/0078700 A1 | 4/2003 | Chee | |
| 2003/0093201 A1 | 5/2003 | Schubert et al. | |
| 2003/0163231 A1 | 8/2003 | Meyers et al. | |
| 2003/0195679 A1 | 10/2003 | McKeown et al. | |
| 2003/0195684 A1 | 10/2003 | Martens | |
| 2003/0212482 A1 | 11/2003 | Lu et al. | |
| 2003/0221899 A1 | 12/2003 | Bender et al. | |
| 2004/0019418 A1 | 1/2004 | Lu et al. | |
| 2004/0024504 A1 | 2/2004 | Salib et al. | |
| 2004/0024505 A1 | 2/2004 | Salib et al. | |
| 2004/0024509 A1 | 2/2004 | Salib et al. | |
| 2004/0030475 A1 | 2/2004 | Lu et al. | |
| 2004/0030479 A1 | 2/2004 | Arndt et al. | |
| 2004/0030481 A1 | 2/2004 | Salib et al. | |
| 2004/0041358 A1 | 3/2004 | Hrovat et al. | |
| 2004/0046447 A1 | 3/2004 | Wanke et al. | |
| 2004/0060765 A1 | 4/2004 | Mattson et al. | |
| 2004/0064236 A1 | 4/2004 | Lu et al. | |

| | | |
|---|---|---|
| 2004/0064237 A1 | 4/2004 | Lu et al. |
| 2004/0068358 A1 | 4/2004 | Walenty et al. |
| 2004/0070268 A1 | 4/2004 | Baumgarten |
| 2004/0074693 A1 | 4/2004 | Mattson et al. |
| 2004/0078131 A1 * | 4/2004 | Faye et al. .................. 701/70 |
| 2004/0102886 A1 | 5/2004 | Lin et al. |
| 2004/0102887 A1 | 5/2004 | Lin et al. |
| 2004/0102894 A1 | 5/2004 | Holler |
| 2004/0111208 A1 | 6/2004 | Meyers et al. |
| 2004/0117071 A1 * | 6/2004 | Bauer .......................... 701/1 |
| 2004/0117085 A1 | 6/2004 | Lu et al. |
| 2004/0128044 A1 | 7/2004 | Hac |
| 2004/0128060 A1 | 7/2004 | Park |
| 2004/0133321 A1 | 7/2004 | Ghoneim et al. |
| 2004/0148077 A1 * | 7/2004 | Yasui et al. ................... 701/41 |
| 2004/0148080 A1 | 7/2004 | Ekmark et al. |
| 2004/0162644 A1 | 8/2004 | Torii et al. |
| 2004/0162654 A1 | 8/2004 | Lu et al. |
| 2004/0167692 A1 | 8/2004 | Lu et al. |
| 2004/0167701 A1 | 8/2004 | Mattson et al. |
| 2004/0172183 A1 | 9/2004 | Lu et al. |
| 2004/0176889 A1 | 9/2004 | Capito |
| 2004/0176890 A1 | 9/2004 | Acker et al. |
| 2004/0176897 A1 | 9/2004 | Williams |
| 2004/0193352 A1 | 9/2004 | Ito et al. |
| 2004/0199314 A1 | 10/2004 | Meyers et al. |
| 2004/0199316 A1 | 10/2004 | Kato et al. |
| 2004/0199317 A1 | 10/2004 | Ogata et al. |
| 2004/0215384 A1 | 10/2004 | Kummel et al. |

FOREIGN PATENT DOCUMENTS

| | | |
|---|---|---|
| DE | 19844540 | 3/2000 |
| EP | 0788932 | 8/1997 |
| EP | 0883522 | 12/1998 |
| JP | 10173109 | 6/1998 |
| JP | 2001213300 | 8/2001 |
| JP | 2002168620 | 6/2002 |
| JP | 1219500 | 7/2002 |
| JP | 2002274214 | 9/2002 |
| JP | 2002274306 | 9/2002 |
| JP | 2002307996 | 10/2002 |

* cited by examiner

FEEDFORWARD CONTROL OF MOTOR VEHICLE ROLL ANGLE

This application claims the benefit of U.S. Provisional Patent Application Ser. No. 60/558,382, entitled "ROLLOVER MITIGATION USING FEEDFORWARD CONTROL," by Aleksander B. Hac et al., filed Apr. 1, 2004, and which is hereby incorporated herein by reference in its entirety.

CROSS-REFERENCE TO RELATED APPLICATIONS

This application is related to application Ser. No. 11/019,145entitled MOTOR VEHICLE CONTROL USING A DYNAMIC FEEDFORWARD APPROACH, by Hsien H. Chen et al., filed Dec. 21, 2004.

TECHNICAL FIELD

The present invention is generally directed to motor vehicle roll angle control and, more specifically, feedforward control of motor vehicle roll angle.

BACKGROUND OF THE INVENTION

Current chassis control algorithms designed to enhance motor vehicle performance, e.g., reduce the likelihood of rollover, have usually employed feedback control. That is, a motor vehicle control system first detects undesirable motor vehicle performance, e.g., a danger of rollover, using sensors that measure a vehicle dynamic response, e.g., lateral acceleration, roll rate, yaw rate and/or wheel speeds. Upon detection of a rollover danger, one or more active automotive systems, e.g., a braking system, a suspension system and front and rear steering systems, have been activated to reduce lateral acceleration and correspondingly the likelihood of vehicle rollover. One drawback of a vehicle control system that implements feedback control is that the system response time must be relatively short for the system to restore vehicle stability before vehicle rollover occurs.

Unfortunately, in vehicle rollover events caused by a panic driver steering input, lateral acceleration, roll angle and roll rate of a vehicle can rapidly change, which places high demands on the control system and requires actuators (e.g., brakes) that have a relatively short response time. Additionally, a control system that implements feedback control also requires additional sensors, such as a roll rate sensor, and estimation algorithms (to determine rollover danger and the amount of control intervention that is necessary), which adds additional cost to the system.

What is needed is a roll angle control technique for a motor vehicle that is economical. It would also be desirable for the control technique to be capable of being implemented as a stand-alone control or in combination with other controls.

SUMMARY OF THE INVENTION

According to one embodiment of the present invention, a technique for reducing excessive motor vehicle roll angle using a feedforward control comprises a number of steps. Initially, a steering angle and a speed of the motor vehicle are determined. Next, a lateral acceleration of the vehicle is estimated based on the steering angle and the speed. Then, a lateral acceleration proportional and derivative (PD) term of the estimated lateral acceleration is determined and roll angle reduction is implemented when the lateral acceleration PD term exceeds a first threshold. According to another aspect, roll angle reduction is achieved through application of a braking force to an outside front wheel of the vehicle. According to this aspect, a magnitude of the braking force may be proportional to a difference between the lateral acceleration PD term and the first threshold.

According to yet another aspect, a roll angle and roll rate of the motor vehicle are estimated from a vehicle roll model. According to this embodiment, roll angle reduction may be implemented when one of the lateral acceleration PD term exceeds a first threshold and a roll angle PD term exceeds a second threshold. The roll angle reduction may be facilitated through application of a braking force to an outside front wheel of the vehicle. The magnitude of the braking force may be proportional to a difference between one of the lateral acceleration PD term and the first threshold and the roll angle PD term and the second threshold.

According to still another embodiment of the present invention, a technique for feedforward brake-based roll angle stability enhancement includes a number of steps. A first transfer function is provided that models a relationship between a steer angle of a motor vehicle and a steer induced lateral force. A second transfer function is provided that models a relationship between a total lateral force acting on the vehicle and a roll angle of the vehicle. A desired system transfer function is determined that models a desired relationship between the total lateral force acting on the vehicle and the roll angle of the vehicle. A feedforward control transfer function is then selected to provide a brake induced lateral force to the vehicle to achieve a desired roll angle for the vehicle. The total lateral force includes the steer induced lateral force and the brake induced lateral force and the feedforward control transfer function is a function of the first transfer function, the second transfer function and the desired system transfer function. The brakes of the vehicle are then controlled to reduce the roll angle of the vehicle responsive to the feedforward control transfer function. According to another aspect, braking is inhibited when one of a tire slip angle is below a first predetermined angle and when the tire slip angle has the wrong sign. According to a different aspect, braking is inhibited when a road surface coefficient of friction (COF) is below a reference COF.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

As mentioned above, many active chassis systems have the capability to positively influence a roll motion of a motor vehicle and, thereby, increase stability of the vehicle. Controlled brake, steering and suspension systems can directly influence lateral tire forces, which are one of the primary inputs to roll motion. By judiciously reducing tire lateral forces at an appropriate instant, it is possible to reduce roll angle and increase the stability of the motor vehicle.

For roll angle reduction, the control of the active systems can be done with a feedforward control structure, or with a combination of feedback and feedforward control. As mentioned above, with feedback control, roll motion is detected using sensors and state estimation algorithms. While feedback control is less sensitive to unforeseen variations, it is also expensive due to the addition of sensors and estimation algorithms. By comparison, feedforward control shapes the overall system response using only input information (e.g., steering input and velocity) to the system and, as such, is typically less expensive as it requires fewer sensors. Furthermore, feedforward control can provide a "lead" or "anticipatory" action, while feedback control occurs later since it "waits" to see the actual motion of the vehicle.

According to one embodiment of the present invention, a feedforward control implements a structured linear system approach (transfer function approach) to provide brake-based roll angle stability enhancement. According to this embodiment, the feedforward control automatically applies a brake force to reduce lateral force in a tire and, thereby, reduce a roll angle of an associated motor vehicle. Following this approach, a practical and economical control system can be developed with a feedforward control structure using only steering angle and vehicle speed. If additional information is available, such as front tire slip angle or road surface friction, brake force may be controlled more precisely at a specific wheel to account for instantaneous operating conditions. Further, the control structure can readily employ a variable deadband to prevent unwanted activations of a brake subsystem.

Figure 1:
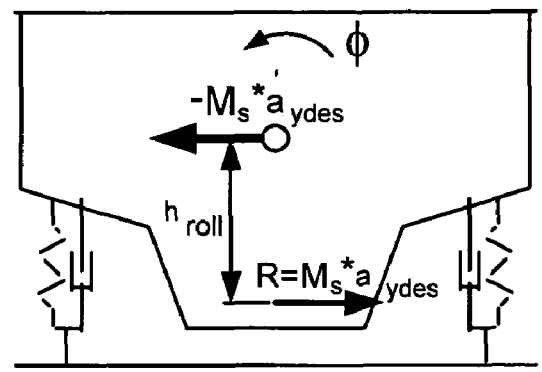
FIG. 1 depicts a simple model of motor vehicle roll motion during ordinary driving.
Figure 1A:
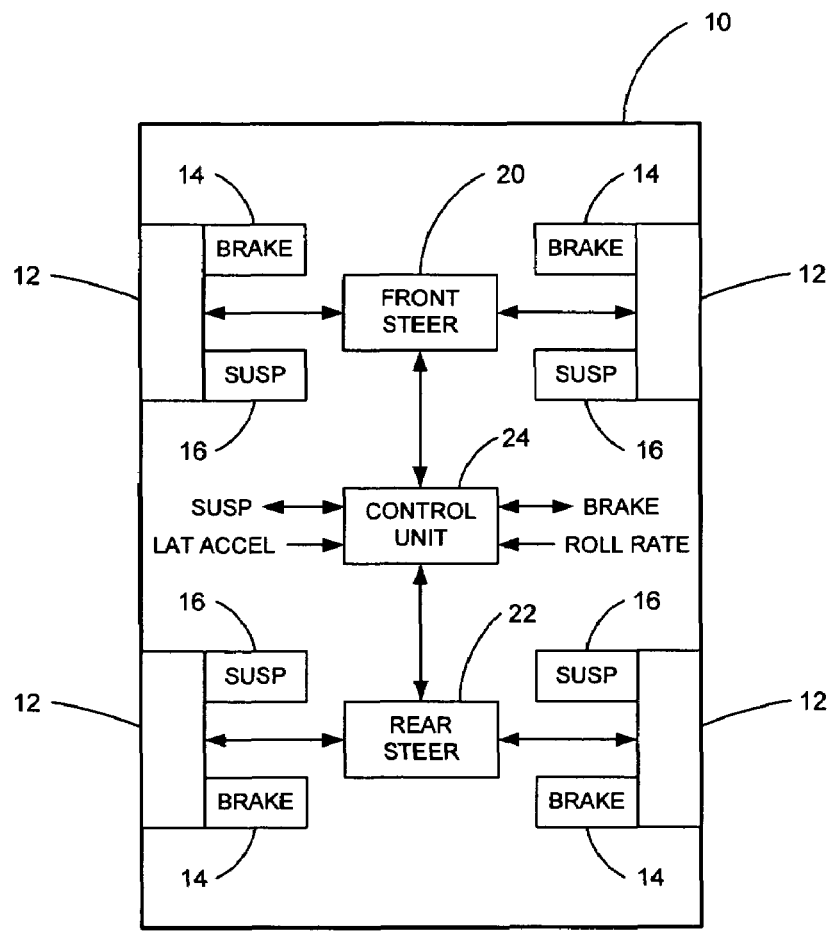
FIG. 1A is an electrical block diagram of an exemplary control system for a motor vehicle.

FIG. 1 depicts a simple model of motor vehicle roll motion during ordinary driving. FIG. 1A is an exemplary electrical block diagram of a control system for a motor vehicle having a body 10 and wheels 12. Each of the wheels 12 is equipped with a brake apparatus 14 and a suspension apparatus 16 supports each corner of the body 10. The suspension apparatus 16 may include a suspension relative displacement sensor that provides an output signal indicative of relative vertical body/wheel position. Either or both of a front steer apparatus 20 and a rear steer apparatus 22 may be controlled by control 24 unit, which may further control brake apparatuses 14 and/or suspension actuators in suspension apparatuses 16. The control unit 24 may optionally receive a lateral acceleration signal (LAT ACCEL) from an associated lateral acceleration sensor and roll rate signal (ROLL RATE) from an associated roll rate sensor, neither of which sensors is shown. The control unit 24 may include a processor programmed to perform selected ones of the processes described herein and may receive and/or output additional signals from/to additional apparatus, not shown.

Figure 2A:
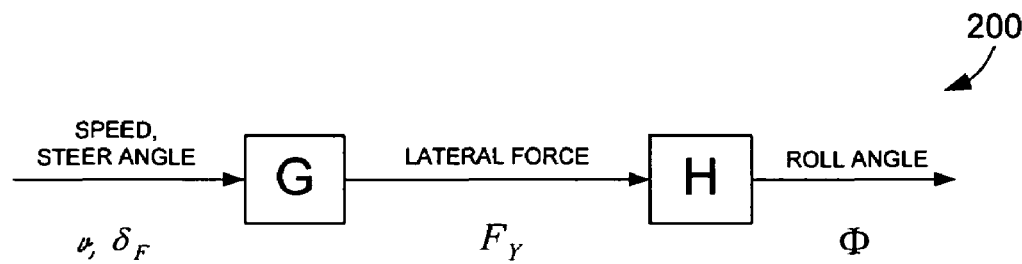
FIG. 2A is a block diagram representation of the physical dynamics of a motor vehicle.

With reference to FIG. 2A, a system 200, which models handling dynamics for a motor vehicle, is depicted. As is shown in FIG. 2A, G is the transfer function from the steer angle $\delta_F$ (and vehicle velocity $v_x$) to the lateral force $F_Y$ and H is the transfer function from the lateral force $F_Y$ to the roll angle $\Phi$. The equation that defines the system 200 of FIG. 2A with respect to the steer angle $\delta_F$ is set forth below:

$$\Phi = H \cdot F_Y = H \cdot G \cdot \delta_F$$

Figure 2B:
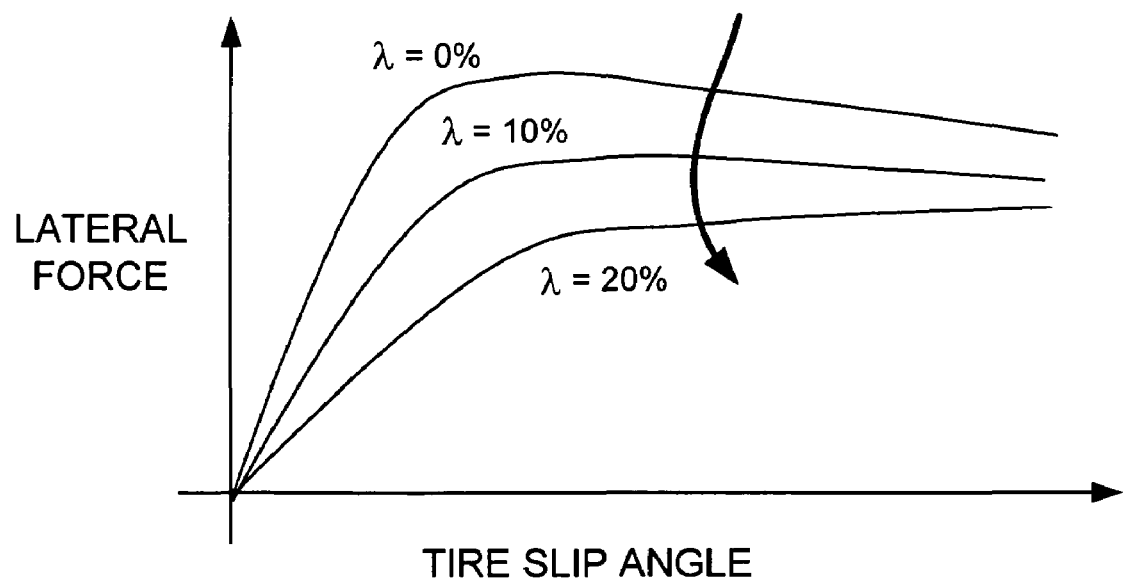
FIG. 2B is a graph depicting the relationship of lateral tire force and tire slip angle for a motor vehicle for several levels of longitudinal slip.
Figure 2C:
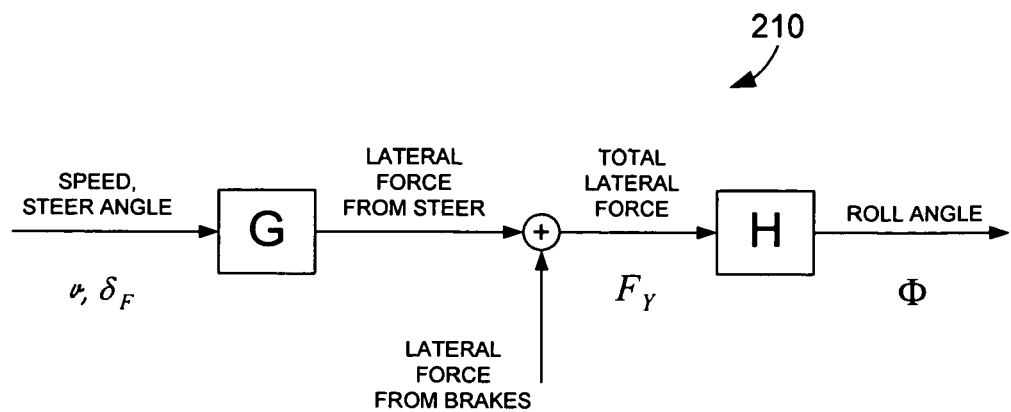
FIG. 2C is a block diagram representation of the physical dynamics of a motor vehicle that includes a brake-induced lateral force component.

According to the present invention, the roll dynamics of a motor vehicle are shaped by applying braking forces to appropriate wheels of the motor vehicle. FIG. 2B depicts the dependency of tire lateral force $F_y$ on tire slip angle for several levels of tire longitudinal slip. This three-way relationship of lateral force, slip angle and longitudinal slip is a well-known characteristic of tires. It should be appreciated from reviewing the lateral force curves that the lateral force $F_y$ can be influenced by modifying the longitudinal tire slip $\lambda$, through application of a braking torque. That is, the lateral force $F_Y$ decreases as the longitudinal slip $\lambda$ increases on a tire. With reference to FIG. 2C, a system 210 is shown that introduces a brake-induced lateral force component into the overall roll dynamic transfer function of the system 200 of FIG. 2A.

Figure 2D:
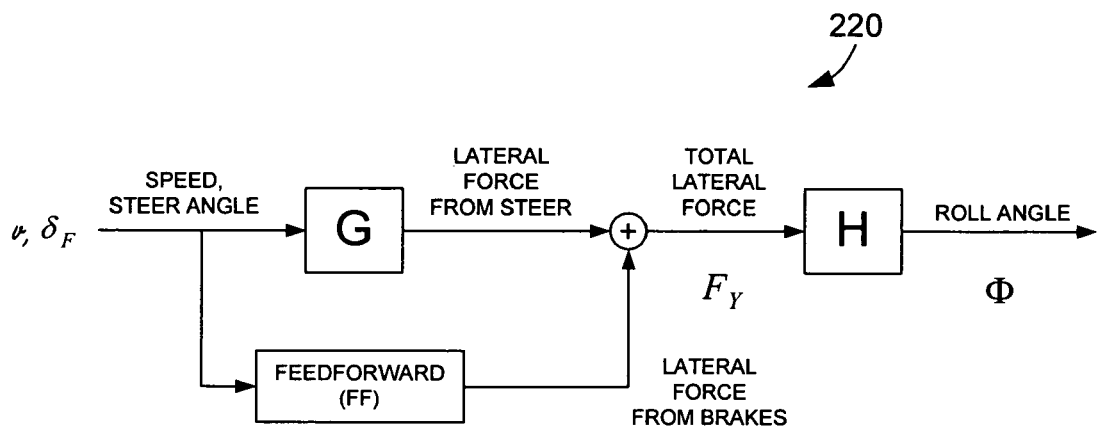
FIG. 2D is a block diagram representation of the physical dynamics of a motor vehicle with a feedforward control structure.

With reference to FIG. 2D, a system 220 for a motor vehicle is depicted that includes a feedforward control structure (added to the system 200 of FIG. 2A) to provide a brake-induced lateral force, which is provided by the brakes of the vehicle. The transfer function of the system 220, with respect to the steer angle $\delta_F$, is set forth in the following equation:

$$\Phi = H \cdot F_Y = H \cdot (G + FF) \cdot \delta_F$$

With reference again to FIG. 2A, the original system 200 has the transfer function set forth below:

$$\Phi_{original} = H \cdot G \cdot \delta_F$$

where H represents the original roll dynamics. In order to reshape the roll dynamics, an equation for a desired roll angle is derived as set forth below:

$$\Phi_{desired} = K \cdot G \cdot \delta_F$$

where K represents the desired roll dynamics. For example, K may have a higher damping than H, a higher stiffness than H, or may have both a higher damping and a higher stiffness than H. Thus, a desired system has the overall transfer function set forth below:

$$\Phi_{desired} = K \cdot G \cdot \delta_F$$

and the system with the feedforward control has the overall transfer function set forth below:

$$\Phi = H \cdot (G + FF) \cdot \delta_F$$

As the actual roll response should be equal to the desired roll response, the two equations are set equal, as is set forth below:

$$H \cdot (G + FF) \cdot \delta_F = K \cdot G \cdot \delta_F$$

Solving for the feedforward (FF) term yields:

$$FF = H^{-1} \cdot K \cdot G - G$$

Thus, the vehicle handling dynamics include transfer functions for the steering system dynamics G, the suspension system dynamics H and for the controllable brake system dynamics, i.e., the FF term. The output of the brake control system, i.e., the FF control structure, ultimately influences lateral force by directly regulating longitudinal force (brake force) on a tire. According to the present invention, the brake-induced lateral force component, which is determined by the brake control equation, is additive to the steer induced lateral force component. The overall system transfer function is then:

$$\Phi = K \cdot G \cdot \delta_F$$

Figure 2E:
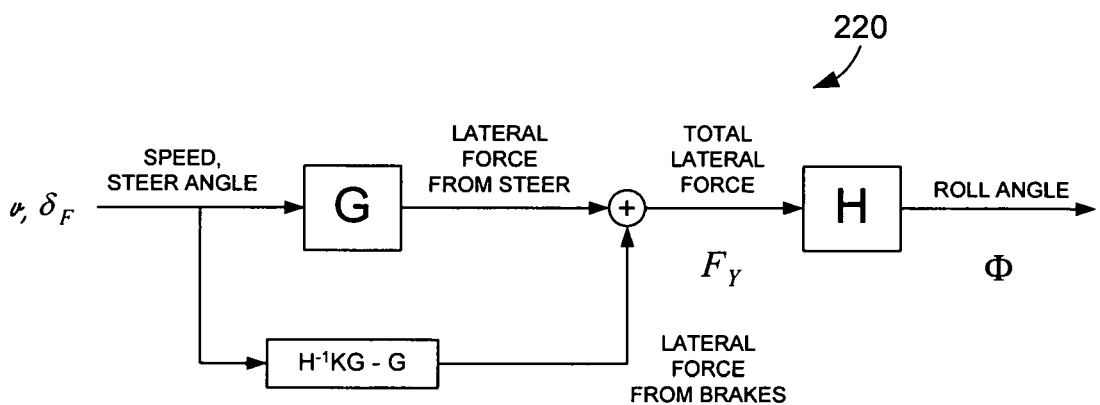
FIG. 2E depicts the block diagram of FIG. 2D with a defined feedforward term.

With reference to FIG. 2E, the FF term is shown replaced with the $H^{-1} \cdot K \cdot G - G$ term.

The transfer function, G(s), between the front steering angle, $\delta_F$, and the total lateral force on vehicle, $F_y$, may have the following form:

$$G(s) = \frac{F_Y(s)}{\delta_F(s)} = G(0) \frac{1 + T_1 s + T_2 s^2}{1 + \frac{2\zeta}{\omega_n} s + \frac{1}{\omega_n^2} s^2}$$

Here G(0) is the ratio of steady state lateral force response to the front steering input, con is undamped natural frequency of vehicle yaw mode, $\zeta$ is the damping ratio of the yaw mode and $T_1$ and $T_2$ are other parameters. The parameters of the above transfer function also depend on vehicle speed, $v_x$, and on vehicle characteristic parameters, which should be apparent to those skilled in art upon reviewing this disclosure. For completeness their values are provided below:

$$G(0) = \frac{M v_x^2}{l + K_u v_x^2}$$

where M is vehicle mass, l is vehicle wheelbase and $K_u$ is the understeer gradient, which is given by:

$$K_u = \frac{C_r b - C_f a}{C_f C_r l} M$$

Here $C_f$ and $C_r$ are the cornering stiffness values of both tires of front and rear axle, respectively, a and b are distances of vehicle center of gravity to front and rear axles, respectively. The remaining parameters in the transfer function are given by:

$$\frac{2\zeta}{\omega_n} = \frac{(C_f a^2 + C_r b^2)M + (C_f + C_r)I_{zz}}{C_f C_r l} \frac{v_x}{l + K_u v_x^2}$$

$$\frac{1}{\omega_n^2} = \frac{M I_{zz}}{C_f C_r l} \frac{v_x^2}{(l + K_u v_x^2)}$$

$$T_1 = \frac{b}{v_x}, T_2 = \frac{I_{zz}}{C_r l},$$

In the above, $I_{zz}$ denotes the yaw moment of inertia of vehicle (that is the moment of inertia of vehicle about the vertical (yaw) axis passing through vehicle center of gravity). The transfer function between the total lateral force (from all four tires), $F_Y$, and vehicle body roll angle, $\phi$, is as follows:

$$H(s) = \frac{\Phi(s)}{F_Y(s)} = \frac{m h_{roll}}{M I_{xx}} \frac{1}{s^2 + 2\zeta_r \omega_{nr} s + \omega_{nr}^2}$$

Here m denotes vehicle body mass, M total mass of vehicle, $h_{roll}$ is the height of vehicle body center of mass above the roll axis, $I_{xx}$ is the body roll moment of inertia, $\omega_{nr}$ is the undamped natural frequency of the body roll mode and $\zeta_r$ is the damping ratio of the roll mode. The last two parameters are given by $$\omega_{nr}^2 = \frac{K_\Phi}{I_{xx}}, 2\zeta_r \omega_{nr} = \frac{C_\Phi}{I_{xx}}$$

Here $K_\Phi$ and $C_\Phi$ are the roll stiffness and damping of vehicle suspension. Again, calculation of the above transfer function is well known to those skilled in art. Moreover, the transfer functions H, G and K may also be dependent upon vehicle speed.

Figure 3A:
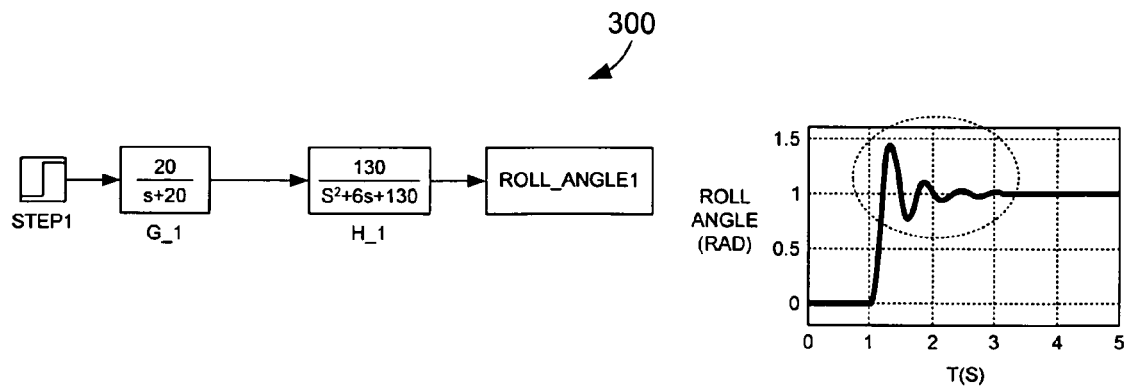
FIG. 3A is a block diagram of a system for a motor vehicle, including a graph depicting the output of the system.
Figure 3B:
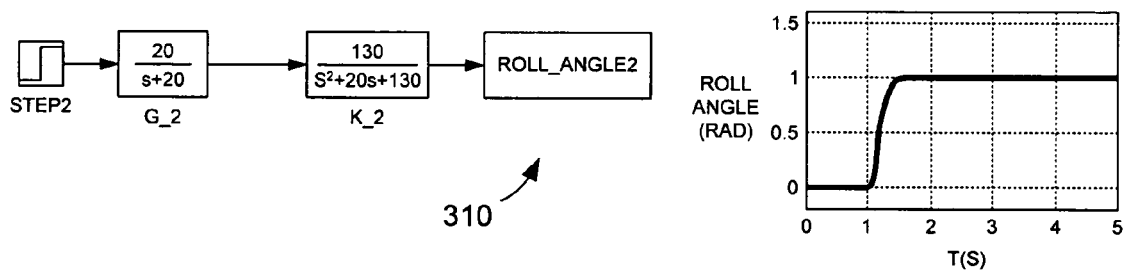
FIG. 3B is a block diagram of a system for a motor vehicle, including a graph depicting the output of the system.
Figure 3C:
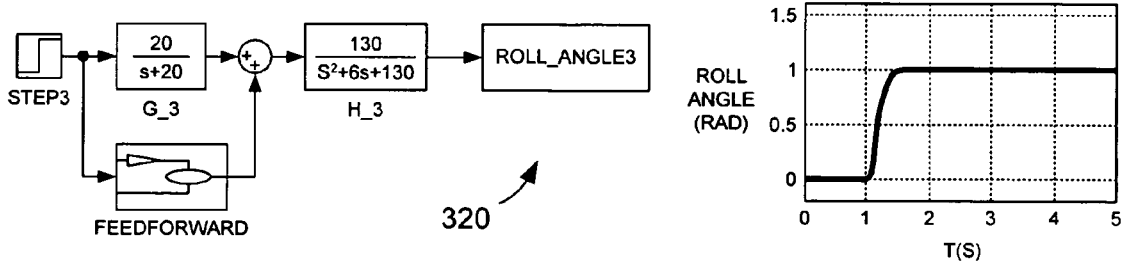
FIG. 3C depicts a block diagram of a system for a motor vehicle that includes a feedforward control structure, according to the present invention, including a graph depicting the output of the system.
Figure 3D:
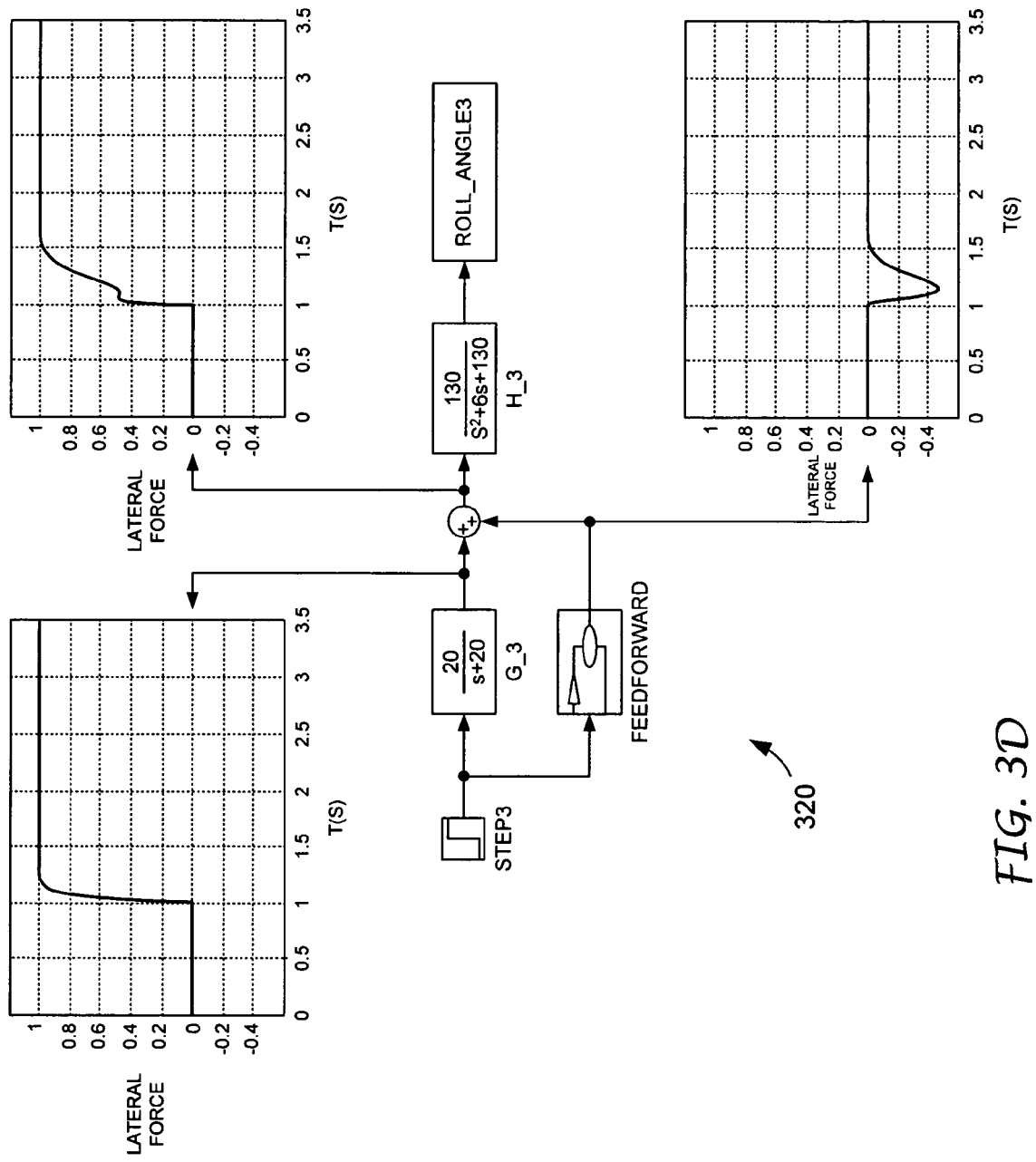
FIG. 3D is a block diagram that correspond to block diagram of the system of FIG. 3C, with representative signals at various points.

With reference to FIGS. 3A-3D, simulation results for a step steer input to various systems are shown. In these examples, the desired roll dynamics K have larger damping than the original roll dynamics H. For simplification, all the transfer functions have a steady-state unity gain and, thus, all signals are normalized. With reference to FIG. 3A, an output of an original system 300 experiences a relatively large overshoot and ringing. As shown in FIG. 3B, a desired system 310, with higher damping, has less overshoot and ringing. As illustrated in FIG. 3C, a system 320, with feedforward control, includes an output whose actual response approximately matches the desired response. With reference to FIG. 3D, signals present at various locations in the system 320 of FIG. 3C are further illustrated.

Figure 4A:
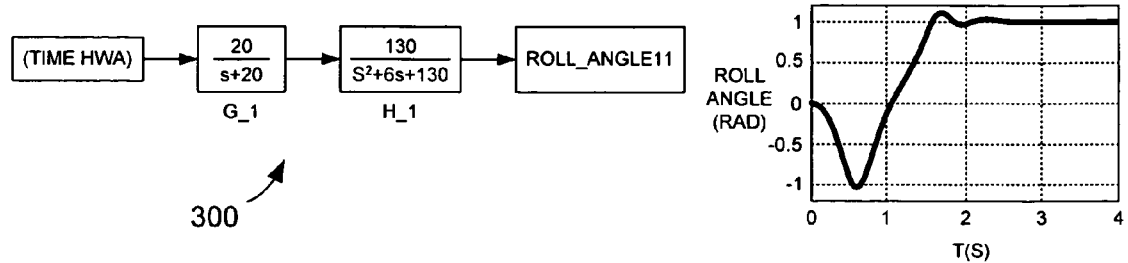
FIG. 4A is a block diagram of a system for a motor vehicle, including a graph depicting the output of the system.
Figure 4B:
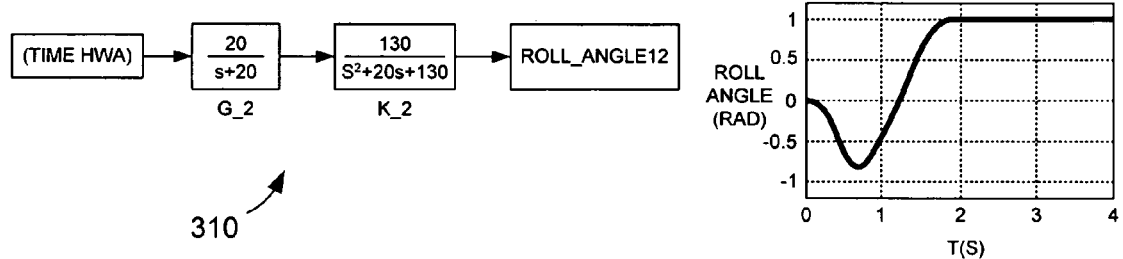
FIG. 4B is a block diagram of a system for a motor vehicle, including a graph depicting the output of the system.
Figure 4C:
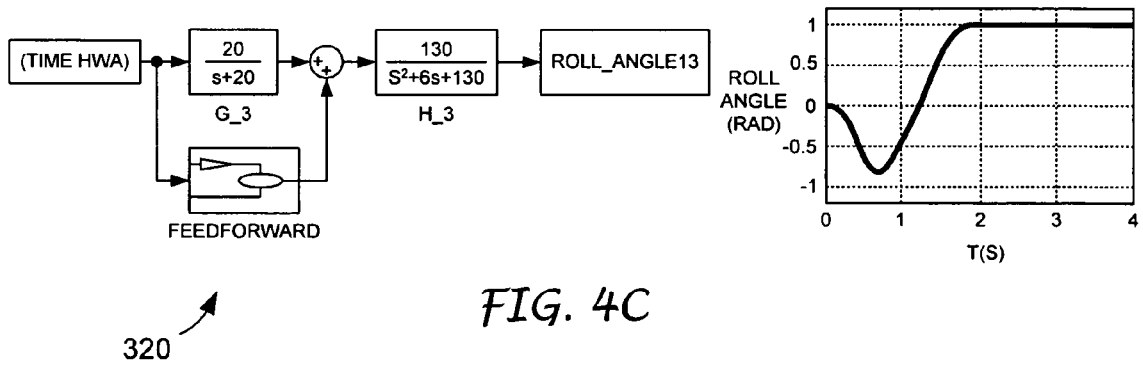
FIG. 4C is a block diagram of a system that includes a feedforward control structure, according to the present invention, including a graph depicting the output of the system.
Figure 4D:
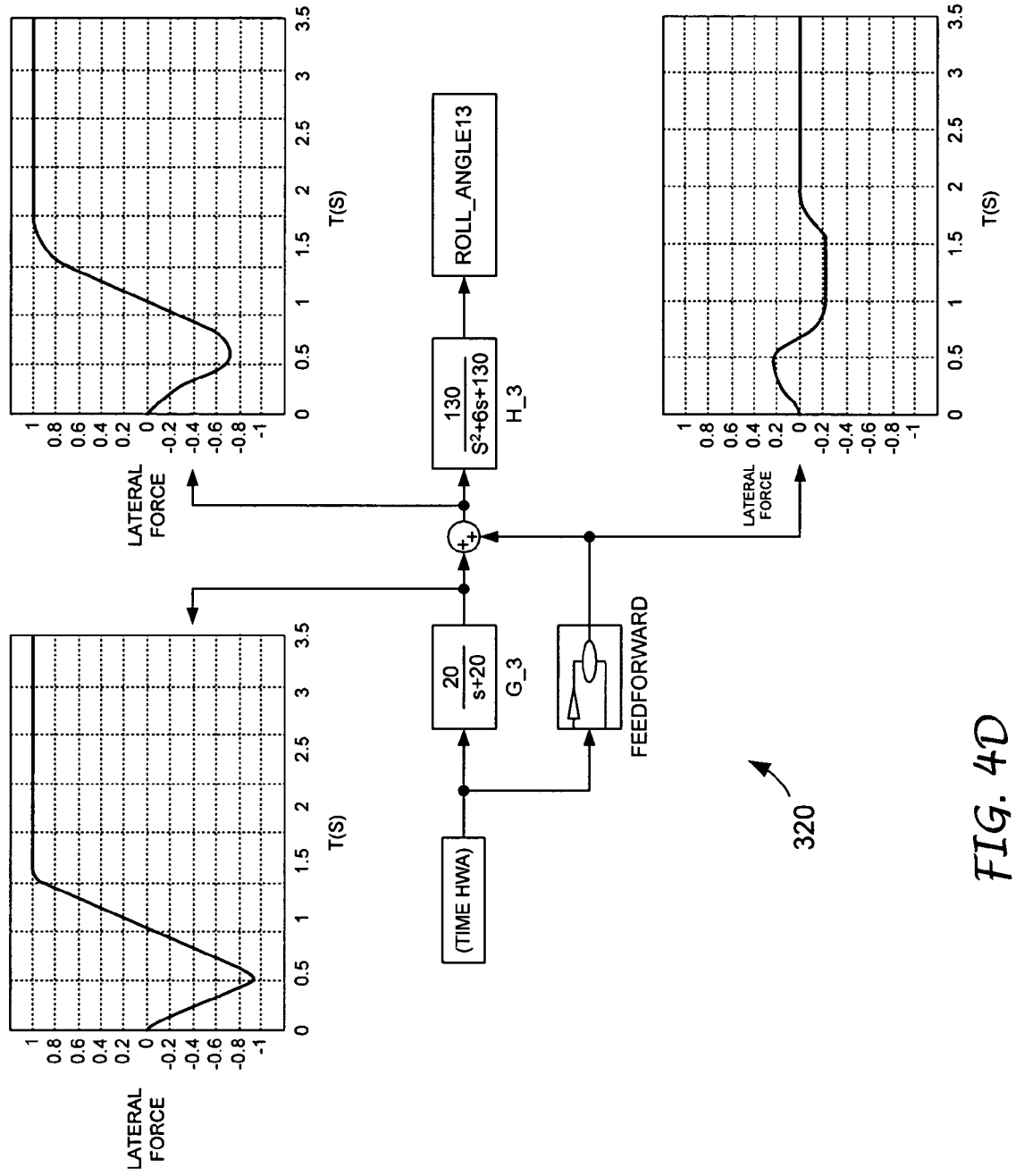
FIG. 4D is a block diagram that corresponds to the block diagram of the system of FIG. 4C, with representative signals at various points.
Figure 9:
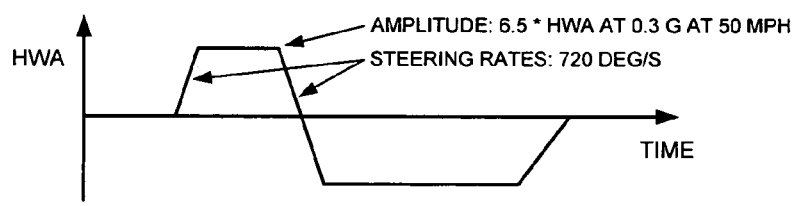
FIG. 9 is a diagram depicting a steering pattern of a motor vehicle in an NHTSA fishhook maneuver.

With reference to FIGS. 4A-4D, simulation results for National Highway Transportation Safety Administration (NHTSA) fishhook maneuvers (see FIG. 9) for the various systems of FIGS. 3A-3C are shown. The output for the original system 300 of FIG. 3A is shown in FIG. 4A. The output for the desired system 310 of FIG. 3B is shown in FIG. 4B and the output for the system 320 of FIG. 3C is shown in FIG. 4C. With reference to FIG. 4D, signals at various locations in the system 320 of FIG. 4C are further depicted.

Figure 5:
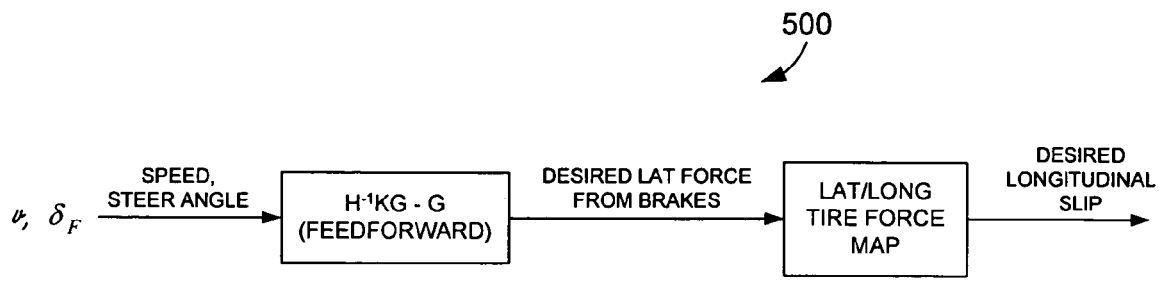
FIG. 5 is a block diagram of a system for a motor vehicle for achieving a desired longitudinal tire slip.

With reference to FIG. 5, an exemplary block diagram of a control system 500 for determining a desired longitudinal tire slip is shown. The output of the feedforward control provides a desired change of lateral force, which is converted to a desired longitudinal tire slip. This conversion can be achieved, for example, by using table look-up relating the desired change of lateral force to the desired change in longitudinal tire slip. Typical look-up table values can be determined from the known relationship of lateral force, slip angle and longitudinal slip for a tire, such as shown in FIG. 2B. Algorithms for estimating tire slip angles are well known to those skilled in art (for example, see U.S. Pat. No. 6,547,343 "Brake System Control" issued on Apr. 15, 2003, the entire disclosure of which is hereby incorporated herein by reference in its entirety). Thus, for a given lateral force command at a given slip angle, a desired longitudinal tire slip can be determined. The brake subsystem of the vehicle can then generate the necessary brake pressure control by using typical longitudinal slip regulation, which is well known for anti-lock brakes, traction control and electronic stability control systems.

It should be appreciated that it is highly desirable to accurately determine the slip angle of the tire such that the brake force is only created when the slip angle is in the right direction or has the right sign. As used herein, the terms "right direction" and "right sign" mean that when the slip angle of a tire and its corresponding lateral force are in the direction that cause an increase of lateral force on the vehicle, then there is the opportunity to apply brake force to that tire to reduce the lateral force and to correspondingly reduce roll motion, if needed. Otherwise, when the slip angle is in the wrong direction or has the wrong sign a brake force is not created. As used herein, the terms "wrong direction" or "wrong sign" mean that when the slip angle of a tire and its corresponding lateral force are in the direction that causes a reduction of lateral force on the vehicle, then it is not necessary to apply brake force to that tire. In fact it would be counterproductive as braking would decrease the magnitude of that lateral force.

Figure 6:
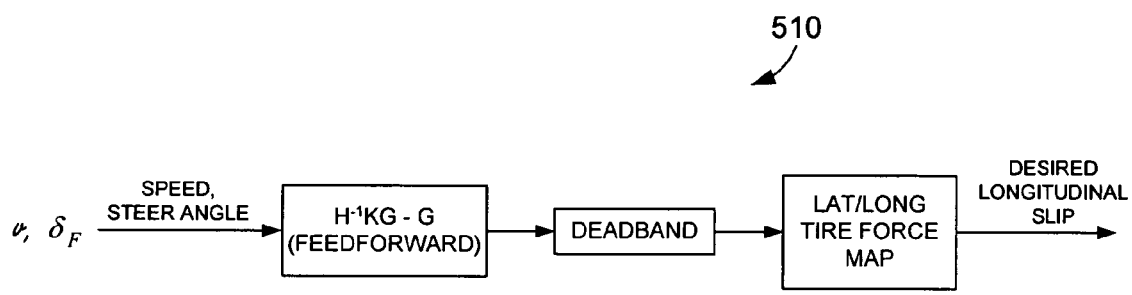
FIG. 6 is a block diagram of a system that corresponds to the system of FIG. 5 with a deadband.

With reference to FIG. 6, a block diagram of a control system 510, i.e., the control system 500 of FIG. 5 with a deadband, is depicted. Due to the intrusive nature of a brake-based control, it is frequently desirable to implement a deadband to prevent unwanted activations of the vehicle brake subsystem. The magnitude of the deadband may generally be a function of slip angle, surface friction and vehicle speed. Specifically, the deadband may include an "inhibiting function" to prevent unwanted brake application when the slip angle is in the wrong direction. The deadband may also include another "inhibiting function" to prevent unwanted brake application when driving on low friction surfaces. Surface friction estimation may be accomplished by the technique disclosed in U.S. Pat. No. 6,125,319 to Aleksander B. Hac et al., entitled "Brake System Control Method Responsive to Measured Vehicle Acceleration," the entire disclosure of which is hereby incorporated herein by reference in its entirety. Furthermore, the deadband magnitude may also be designed to change as a function of vehicle speed, to provide tighter control at higher speeds. Accordingly, a feedforward control structure has been described that automatically applies a brake force to reduce lateral force on a tire and, thereby, reduce a roll angle of an associated motor vehicle.

According to another embodiment of the present invention, a feedforward control (algorithm) uses front steering angle and vehicle speed (and optionally a measured lateral acceleration) to predict excessive vehicle roll angle. When excessive vehicle roll angle is detected, active control is implemented (e.g., brakes are applied) to reduce vehicle roll angle. The feedforward control can be used as a stand-alone structure or used in combination with a feedback control to eliminate latent response of the feedback control.

Various implementations of this embodiment of the present invention provide feedforward control algorithms for detection and prevention of excessive vehicle roll angle (in particular, excessive maneuver-induced roll motion). In general, the algorithms use measured steering angle and (estimated) vehicle speed and optionally measured lateral acceleration. A number of different versions of the algorithm may be utilized, depending on vehicle type and the availability of a lateral acceleration sensor. The basic concept is to determine from the steering angle and vehicle speed when a vehicle may experience excessive roll angle and apply an active chassis structure, e.g., braking, to reduce roll angle.

If a vehicle roll mode is very well damped, excessive roll angle can be predicted on the basis of calculated (desired) lateral acceleration (determined from steering angle and speed), without considering roll mode. If the roll mode is underdamped, a combination of desired lateral acceleration and roll angle/roll rate predicted by a simple roll model (a dynamic filter) may be used. In addition, when a lateral acceleration sensor is available, it may be used primarily for the purpose of minimizing false activations.

As used herein, the term "desired lateral acceleration" refers to the lateral acceleration determined from vehicle speed and steering angle. This value generally corresponds to the acceleration that a vehicle develops on a dry surface at a given steering angle and speed. It is generally derived from a bicycle model (in various forms, e.g., differential equation or transfer function) and may involve some limiting of magnitude (since a linear bicycle model overestimates lateral forces and lateral acceleration at large steer angles). A steady-state value of desired lateral acceleration can also be used as it is an algebraic function of steering angle and vehicle speed.

EXAMPLE 1

A desired lateral acceleration may be determined using the following steady-state relationship:

$$Ay\_des = delta*vx*vx/(L+Ku*vx*vx)$$

where delta is the front steering angle, vx is the vehicle speed, L is the vehicle wheelbase and Ku is the vehicle understeer coefficient. A proportional and derivative (PD) term of desired lateral acceleration is then determined from:

$$Ay\_des\_PD = |Ay\_des + eps*d(Ay\_des)/dt|$$

where eps is a positive number less than 1 (e.g., 0.15). The purpose of adding a differential term is to achieve a better prediction of vehicle response.

Optionally, for vehicles with an underdamped roll mode, a predicted roll angle phi and roll rate d(phi)/dt are determined from, for example, the following motor vehicle roll model:

$$d^2phi/dt^2 + 2*zeta*omn*dphi/dt + omn^2*phi = -kroll*omn^2*Ay\_des\_lim$$

where phi is the roll angle, omn is the undamped natural frequency of the roll mode, kroll is the roll gain and Ay_des_lim is the desired lateral acceleration limited in magnitude. If measured lateral acceleration is available, Ay_des_lim can be replaced by the measured lateral acceleration Aym.

When Ay_des_PD exceeds a threshold or if a PD term based on predicted roll angle (phi+eps1*dphi/dt) exceeds another threshold, control intervention is implemented. The strength of intervention may be proportional to how much the PD terms (defined above) exceed their thresholds. For example, brake torques may be:

M_brake=Ka*(Ay_des_PD−Ay_thresh)+Kp*(Phi_PD−Phi_Thresh)

when Ay_des_PD or Phi_PD exceed their thresholds, and zero otherwise. The direction of intervention (e.g., braking or steering) is implemented to reduce roll angle and lateral acceleration. If measured lateral acceleration is available, additional necessary conditions are checked before intervention. For example, a necessary condition may require that the Ay_des_PD term and the measured lateral acceleration Aym have the same signs.

EXAMPLE 2

In this example, the desired lateral acceleration Ay_des is derived from the steering angle and the motor vehicle speed and there is no attempt to estimate or predict the roll angle and therefore no "reference model" for vehicle roll angle or roll rate.

Using this approach, the desired lateral acceleration Ay_des may be determined using a steady-state value:

$$Ay\_des = delta*vx*vx/(L+Ku*vx*vx) \quad (1)$$

where delta is the front wheel steering angle, vx is the vehicle speed, L is the vehicle wheel base and Ku is the understeer coefficient. As above, a proportional and derivative (PD) term of desired lateral acceleration is then calculated:

$$Ay\_des\_PD = Ay\_des + eps*d(Ay\_des)/dt \quad (2)$$

Here eps is a constant, which is much less than 1 (for example, about 0.15). The purpose of including the differential term is to achieve better prediction of vehicle response in maneuvers involving quick changes in steer angle, such as in a fishhook maneuver. The value of eps can vary with the magnitude of Ay_des. For example, eps can be larger when Ay_des increases and smaller when Ay_des is decreasing.

Ay_des_PD and measured lateral acceleration Aym are then used to determine an appropriate brake control. For example, using "fuzzy if then" rules may be implemented. For example, let Ay_des_PD be small (in magnitude) when <10 m/s², medium when 10-15 m/s² and large when >15 m/s². Similarly, measured lateral acceleration Aym is small when it is less then 4 m/s², medium when between 4 to 6 m/s², and large above 6 m/s². The rollover brake control is off: when Ay_des_PD and Aym have opposite signs; or when they have the same signs but both are small; or Ay_des_PD is small and Aym is medium. The rollover brake control is set for a low to medium response when: Ay_des_PD and Aym are of the same signs and either Ay_des_PD is high or Ay_des_PD is medium and Aym is at least medium. The rollover brake control is set for a high response when Ay_des_PD and Aym are of the same signs and Ay_des_PD is high and Aym is medium to high. This logic can be expressed in terms of equations depending on Ay_des_PD or obtained from two-dimensional look-up tables. Additional logic can be added using timers, if desired. For example if Ay_des_PD has been high for some time, but lateral acceleration remains low, the algorithm can terminate.

The general idea is to generate a low to moderate brake activation early on when abnormally large desired lateral acceleration is commanded by the driver and then monitor lateral acceleration to make sure that it is large enough (and in the same direction) before applying heavier braking. An advantage of this technique is that it predicts excessive roll angle (in maneuver induced situations) early on, which is desirable when the response of the brake control system is slow.

In this embodiment, the system activates during abrupt and/or large steering movements (for a specific speed), so some unnecessary activations may occur. In order to minimize unnecessary activations (for example during harmonic steer inputs), the term Ay_des_PD may be low-pass filtered or the desired lateral acceleration may be obtained from a dynamic model. In general, this approach does not account explicitly for the dynamics of the roll mode.

EXAMPLE 3

A dynamic or static yaw-plane vehicle model may be used to predict lateral acceleration (Ay_des) and a separate model may be used to describe the roll motion. The model describing the roll motion can be driven by either desired lateral acceleration Ay_des or measured lateral acceleration Aym, or a combination of the two. In this approach a yaw-plane model may be used to determine the desired lateral acceleration and the roll mode may be described by the following equation:

$$\ddot{\phi} + 2\zeta\omega_n\dot{\phi} + \omega_n^2\phi = -k_{roll}\omega_n^2 \alpha_y \quad (3)$$

where $\phi$ is the roll angle, $\omega_n$ is the undamped natural frequency of the roll mode, $k_{roll}$ is the roll gain and $\alpha_y$ is the desired lateral acceleration or optionally measured lateral acceleration (if available). This model can be used to determine a combination of roll angle and roll rate or the energy of roll mode. If this combination exceeds a threshold, which should be dependent on the magnitude of lateral acceleration (alternatively, lateral acceleration can be included in the energy term) the brake system is activated. In principle, the above equation can be used to predict future roll angle, but since the future roll angle depends on future lateral acceleration (which is unknown), it is of limited value beyond a very short period of time.

Another approach uses a "reference model" for roll angle, which generates the desired roll angle, $\phi_{des}$. Then, the desired change in lateral acceleration $\Delta a_y$ can be determined to force the actual roll angle to follow the desired one. This change (almost always a reduction) in lateral acceleration can then be expressed in terms of a braking force. For example, assume that the vehicle roll model is described by the above equation, but the desired response is characterized by a higher damping coefficient, $\zeta_1 > \zeta$. An equation for this reference model is:

$$\ddot{\phi}_{des} + 2\zeta_1\omega_n\dot{\phi}_{des} + \omega_n^2\phi_{des} = -k_{roll}\omega_n^2 \alpha_y \quad (4)$$

In this case, it is generally desirable for the actual vehicle to follow the desired roll response under influence of lateral acceleration $a_y - \Delta a_y$, which provides:

$$\ddot{\phi}_{des} + 2\zeta\omega_n\dot{\phi}_{des} + \omega_n^2\phi_{des} = -k_{roll}\omega_n^2(\alpha_y - \Delta\alpha_y) \quad (5)$$

Using the two equations set forth immediately above to solve for $\Delta a_y$ yields:

$$\Delta a_y = -\frac{2(\varsigma_1 - \varsigma)\dot{\phi}_{des}}{k_{roll}\omega_n} \quad (6)$$

which can be converted into a braking torque or a delta velocity signal. If the "reference model" has higher damping and lower roll gain, the change of lateral acceleration is dependent on the desired roll angle, roll rate and roll acceleration. With this approach, an attempt can also be made to predict the future roll angle and minimize the difference in the future roll angle between the reference model and the actual vehicle model.

Overall, with this approach it is difficult to achieve as early prediction of excessive roll angle as in the previous example, because roll response follows the desired lateral acceleration with a substantial delay. In general, this approach is also more complex.

A typical motor vehicle response in a fishhook maneuver (see FIG. 9) is shown in the curves of the graphs of FIGS. 7A-7B and FIGS. 8A-8B. With specific reference to FIG. 7A, in a first turn, a maximum in a measured lateral acceleration Aym curve 702 occurs at about 1.1 S and a maximum in roll angle RA curve 712 occurs shortly afterwards, at about 1.15 S. Thus, measured lateral acceleration Aym, by itself, does not provide sufficient lead time. A combination of measured lateral acceleration Aym and its derivative can improve the situation somewhat, but the derivative term typically needs to be small, as it tends to be noisy and sensitive to vehicle vibrations, brake application, etc. Large roll angle can be predicted by observing the desired lateral acceleration or a combination of desired lateral acceleration and its derivative (desired lateral acceleration PD term). If any of them exceeds a corresponding threshold value, for example 12 m/s² for the desired lateral acceleration and 16 m/s² for the lateral acceleration PD term, large roll angle can be anticipated. Using desired lateral acceleration Ay_des, as shown by Ay_des curve 704 provides about 0.2 S prediction (before roll angle reaches a maximum value) and the combination of desired lateral acceleration Ay_des and its derivative (see curve 706) gives about 0.45 S of prediction. Using estimated roll angle (see curve 714) does not give any prediction, but roll angle in combination with roll rate can provide about 0.25 S.

Figure 7A:
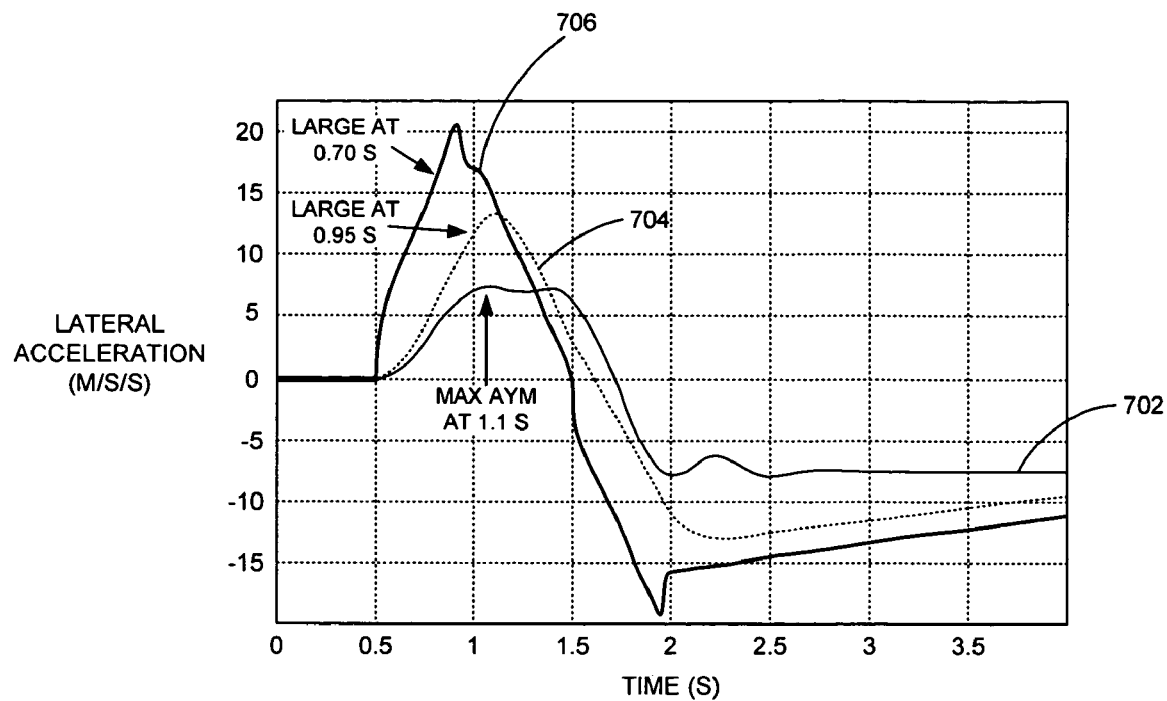
FIGS. 7A-7B are exemplary performance response curves of a motor vehicle in a fishhook maneuver.
Figure 7B:
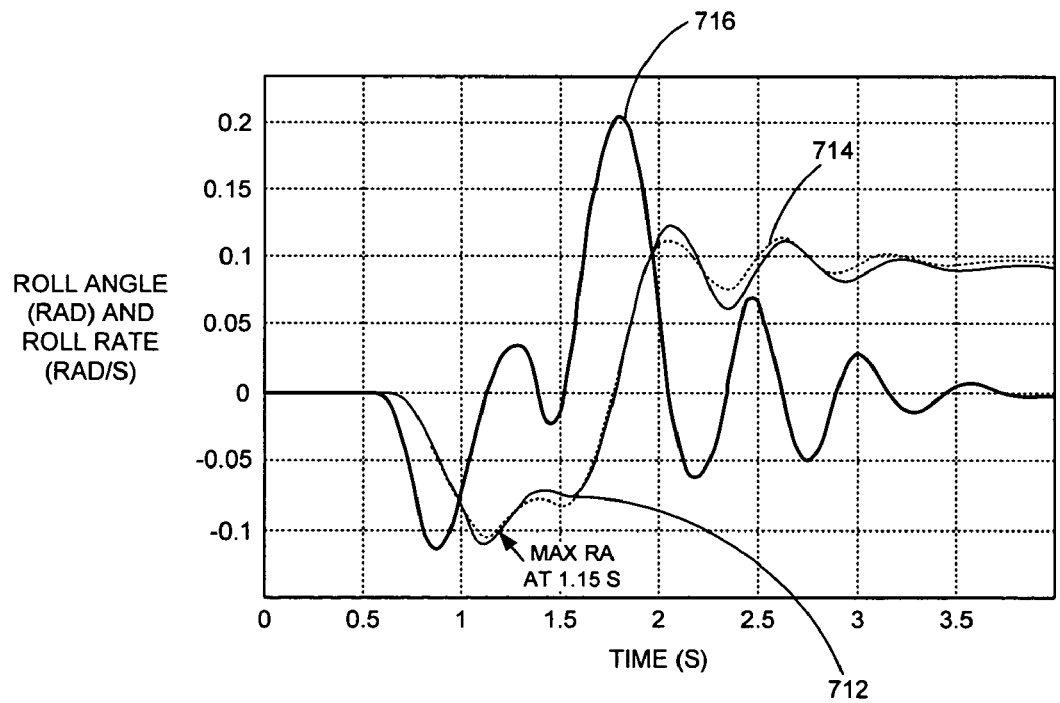
Figure 8A:
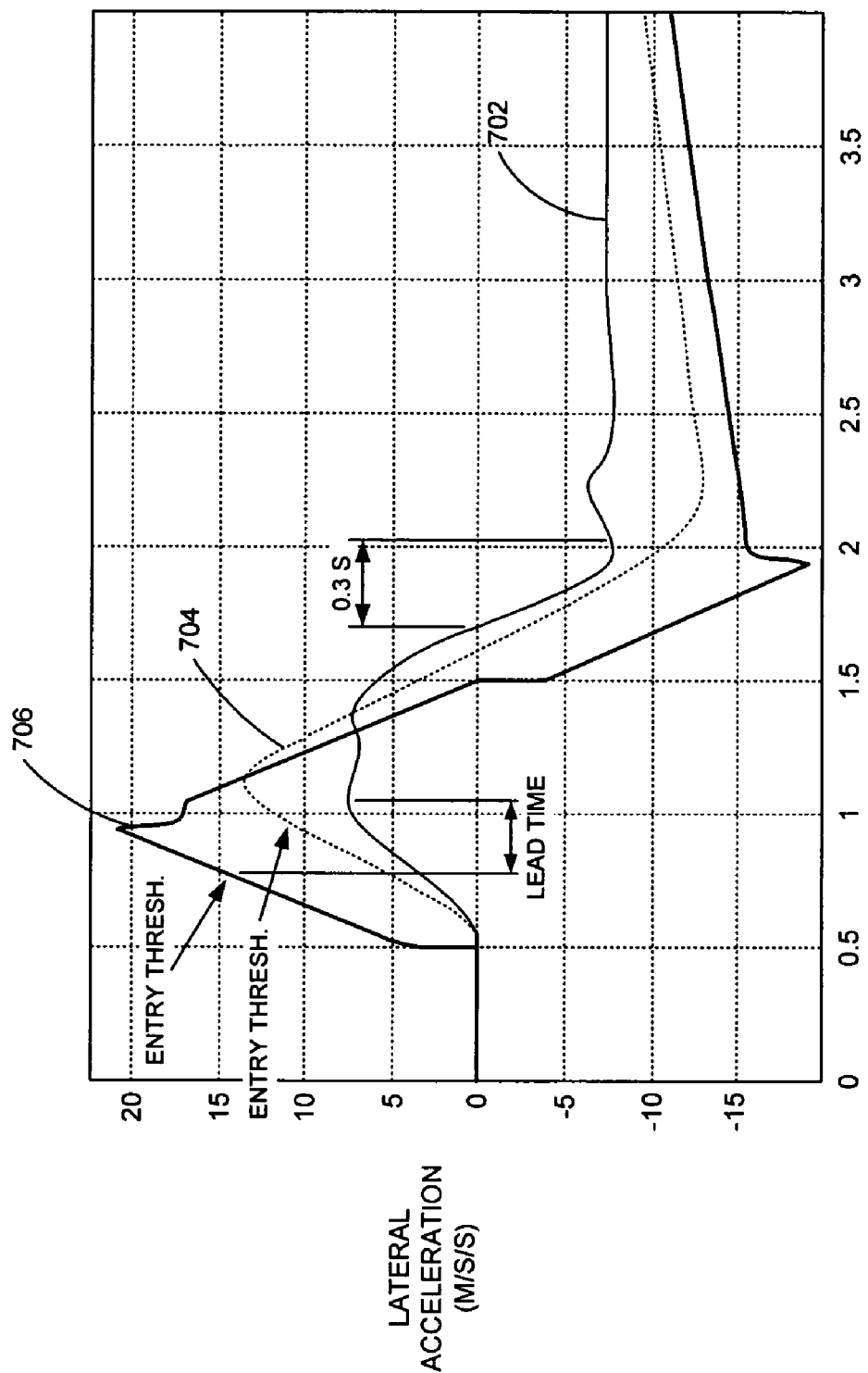
FIGS. 8A-8B are exemplary performance response curves of a motor vehicle that correspond to the curves of FIGS. 7A-7B, with additional information.
Figure 8B:
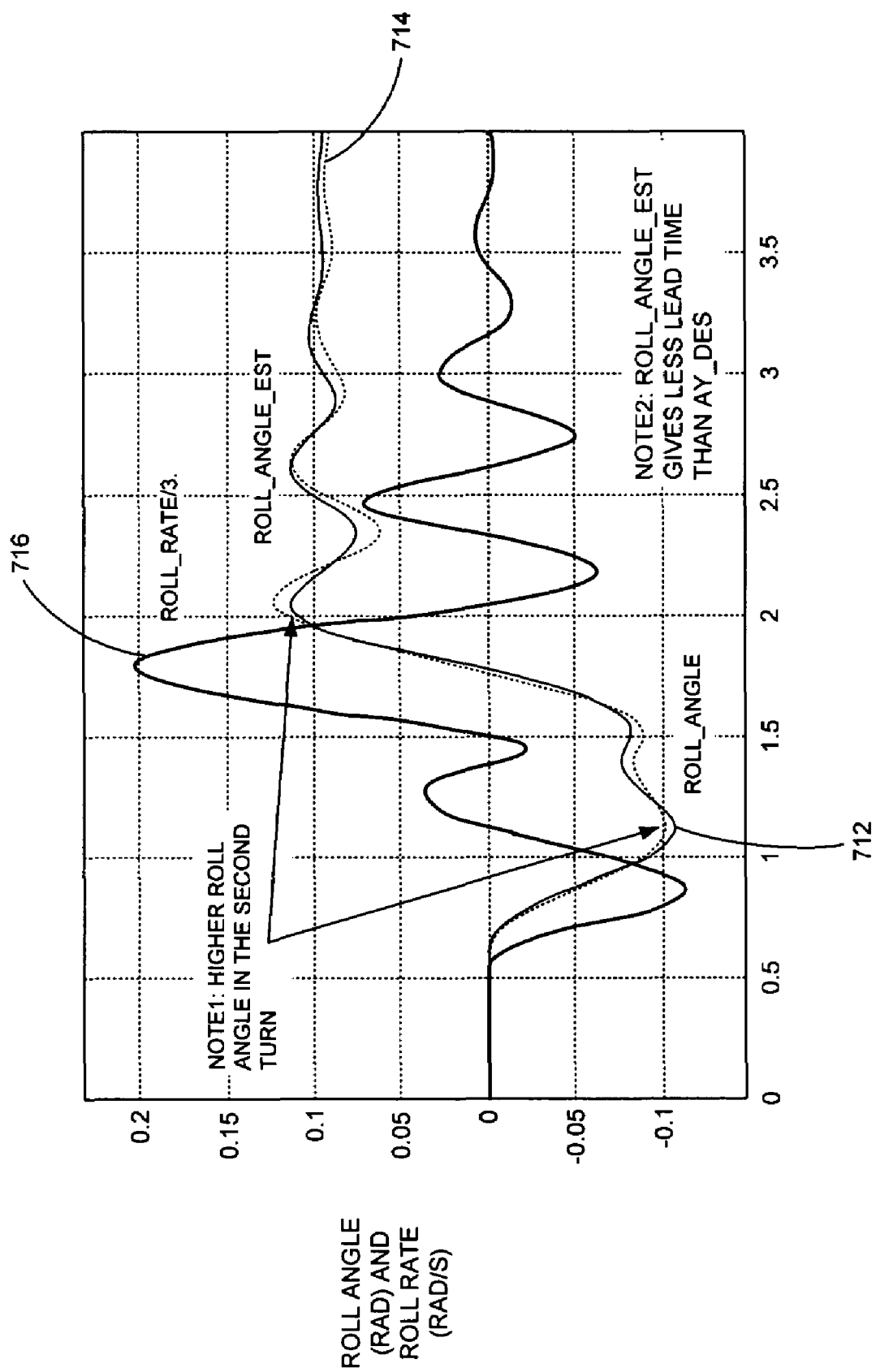
Figure 8C:
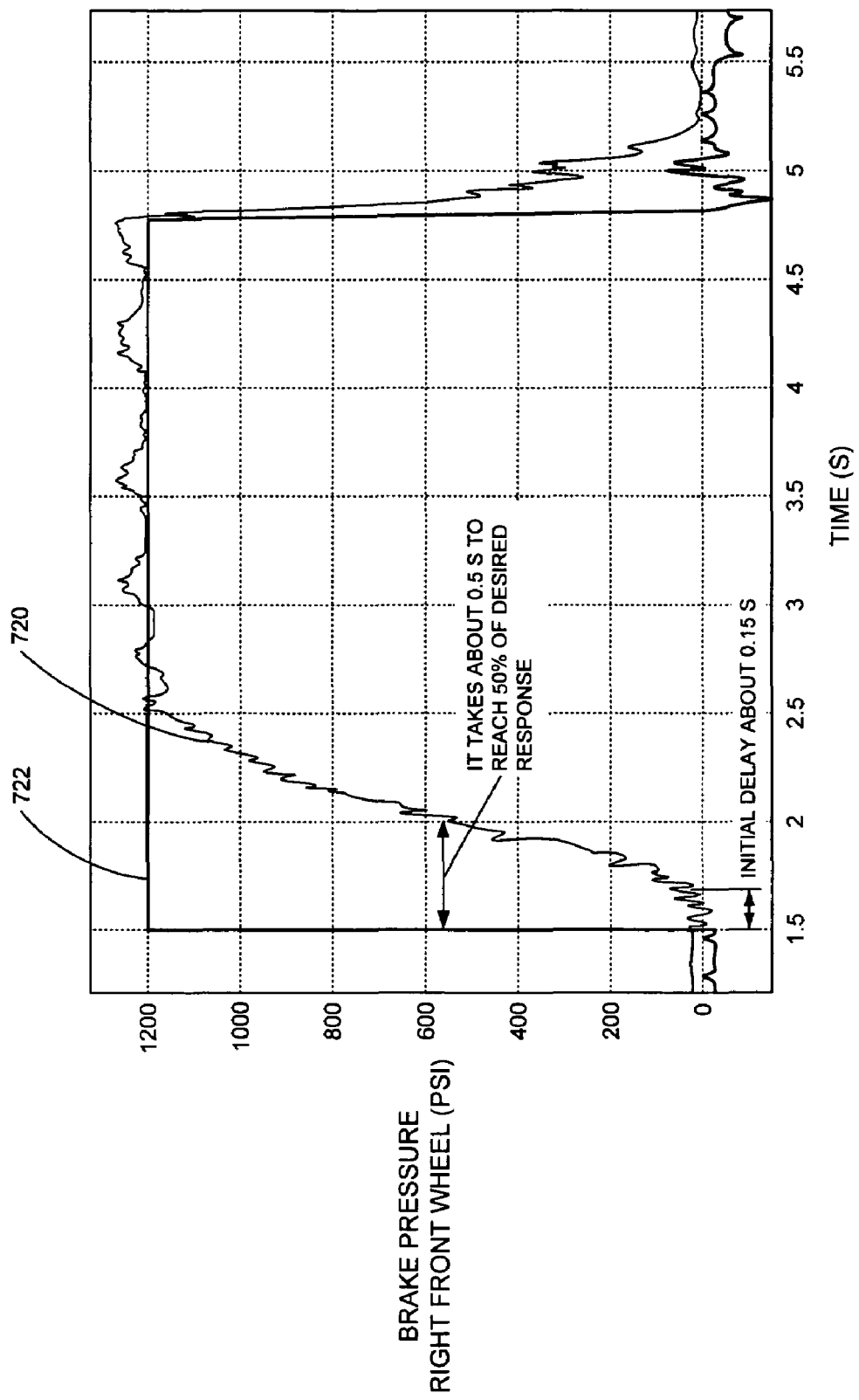
FIG. 8C depicts an exemplary brake system step response curve.

In FIG. 7B, the estimate of roll angle (see curve 714) is derived from equation (3) driven by measured lateral acceleration Aym. An additional prediction time of about 0.1 S can be added if the desired acceleration is used in place of measured lateral acceleration. Overall, the use of desired lateral acceleration PD term (see curve 706) generally has the most predictive power. It should be noted, however, that the desired lateral acceleration and its PD term are slightly lower in the second turn than in the first one (since vehicle velocity drops during maneuver). On the other hand, the roll model correctly predicts that the roll angle (and also roll rate) is higher in the second turn. This is because the roll model captures fundamental dynamics of the roll mode, at least for the nominal vehicle parameters. The algorithm based on desired lateral acceleration alone, without the roll mode, does not do that. FIG. 8C is a graph that depicts an exemplary brake system step response curve 722 and an actual brake response curve 720 to illustrate the delay in brake actuation after driver application of a brake subsystem. As is shown, after an initial delay of about 0.15 S, the actual brake response for a right front wheel of the motor vehicle reaches about fifty percent of a desired response about 0.5 S after brake actuation.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method for reducing excessive motor vehicle roll angle using a feedforward control, comprising the steps of:
    determining a steering angle of a vehicle;
    determining a speed of the vehicle;
    estimating a lateral acceleration of the vehicle based on the steering angle and the speed;
    determining a lateral acceleration proportional and derivative (PD) term of the estimated lateral acceleration; and
    implementing roll angle reduction when the lateral acceleration PD term exceeds a first threshold.

2. The method of claim 1, wherein the step of implementing roll angle reduction when a lateral acceleration PD term exceeds a first threshold includes the step of:
    applying braking force to an outside front wheel of the vehicle.

3. The method of claim 2, wherein the magnitude of the braking force is proportional to a difference between the lateral acceleration PD term and the first threshold.

4. The method of claim 1, further comprising the step of:
    estimating a roll angle and roll rate from a vehicle roll model.

5. The method of claim 4, wherein the step of implementing roll angle reduction when the lateral acceleration PD term exceeds a first threshold further comprises the step of:
    implementing roll angle reduction when one of the lateral acceleration PD term exceeds a first threshold and a roll angle PD term exceeds a second threshold.

6. The method of claim 5, wherein the step of implementing roll angle reduction when one of the lateral acceleration PD term exceeds a first threshold and a roll angle PD term exceeds a second threshold includes the step of:
    applying braking force to an outside front wheel of the vehicle.

7. The method of claim 6, wherein the magnitude of the braking force is proportional to a difference between one of the lateral acceleration PD term and the first threshold and the roll angle PD term and the second threshold. applying braking force to an outside front wheel of the vehicle.

8. The method of claim 1, further comprising the step of providing at least one sensor, wherein the at least one sensor determines the steering angle of the vehicle and the speed of the vehicle.

9. The method of claim 1, further comprising the step of providing a control unit, wherein the control unit estimates the lateral acceleration of the vehicle based on the steering angle and the speed, and determines a lateral acceleration PD term.

10. The method of claim 1, further comprising the step of providing a motor vehicle subsystem, wherein the motor vehicle subsystem implements roll angle reduction when the lateral acceleration PD term exceeds the first threshold.

11. A method for feedforward brake-based roll angle stability enhancement, comprising the steps of:
    providing a first transfer function that models a relationship between a steer angle of a motor vehicle and a steer induced lateral force;

providing a second transfer function that models a relationship between a total lateral force acting on the vehicle and a roll angle of the vehicle;

determining a desired system transfer function that models a desired relationship between the total lateral force acting on the vehicle and the roll angle of the vehicle;

selecting a feedforward control transfer function to provide a brake induced lateral force to the vehicle to achieve a desired roll angle for the vehicle, wherein the total lateral force includes the steer induced lateral force and the brake induced lateral force, and wherein the feedforward control transfer function is a function of the first transfer function, the second transfer function and the desired system transfer function; and controlling brakes of the vehicle to reduce the roll angle of the vehicle responsive to the feedforward control transfer function.

12. The method of claim 11, wherein the step of controlling brakes of the vehicle responsive to the feedforward control transfer function includes the step of:

inhibiting braking when one of a tire slip angle is below a first predetermined angle and when the tire slip angle has a wrong sign.

13. The method of claim 11, wherein the first transfer function is motor vehicle speed dependent.

14. The method of claim 11, wherein the step of controlling brakes of the vehicle responsive to the feedforward control transfer function includes the step of:

inhibiting braking when a road surface coefficient of friction (COF) is below a reference COF.

15. A control system including a feedforward control for reducing excessive motor vehicle roll angle, the system comprising:

at least one sensor for providing a steering angle of a motor vehicle and a speed of the vehicle;

a control unit for estimating a lateral acceleration of the vehicle based on the steering angle and the speed coupled to the at least one sensor, the control unit determining a lateral acceleration proportional and derivative (PD) term of the estimated lateral acceleration; and a motor vehicle subsystem coupled to the control unit, the control unit providing a command to the subsystem to implement roll angle reduction when the lateral acceleration PD term exceeds a first threshold.

16. The system of claim 15, wherein the roll angle reduction is achieved through application of a braking force to an outside front wheel of the vehicle.

17. The system of claim 16, wherein the magnitude of the braking force is proportional to a difference between the lateral acceleration PD term and the first threshold.

18. The system of claim 15, wherein the control unit also implements a vehicle roll model to estimate a roll angle and a roll rate.

19. The system of claim 18, wherein the control unit implements the roll angle reduction when one of the lateral acceleration PD term exceeds a first threshold and a roll angle PD term exceeds a second threshold.

20. The system of claim 19, wherein the roll angle reduction is implemented through application of a braking force to an outside front wheel of the vehicle.

21. The system of claim 20, wherein the magnitude of the braking force is proportional to a difference between one of the lateral acceleration PD term and the first threshold and the roll angle PD term and the second threshold.

22. A control system that implements feedforward brake-based roll angle stability enhancement, the system comprising:

at least one sensor for providing a steer angle of a motor vehicle;

a control unit coupled to the at least one sensor, the control unit implementing a feedforward control transfer function to provide a brake induced lateral force to the vehicle to achieve a desired roll angle for the vehicle, wherein the feedforward control transfer function is based on a first transfer function, a second transfer function and a desired system transfer function, and wherein the first transfer function models a relationship between the steer angle of the vehicle and a steer induced lateral force, the second transfer function models a relationship between a total lateral force acting on the vehicle and a roll angle of the vehicle and the desired system transfer function models a desired relationship between the total lateral force acting on the vehicle and the roll angle of the vehicle, where the total lateral force includes the steer induced lateral force and the brake induced lateral force; and a brake subsystem coupled to the control unit, the control unit providing a command to the brake subsystem for controlling brakes of the vehicle to reduce the roll angle of the vehicle responsive to the feedforward control transfer function.

23. The system of claim 22, wherein the control unit inhibits braking when one of a tire slip angle is below a first predetermined angle and when the tire slip angle has a wrong sign.

24. The system of claim 22, wherein the first transfer function is motor vehicle speed dependent.

25. The system of claim 22, wherein the control unit inhibits braking when a road surface coefficient of friction (COF) is below a reference COF.

* * * * *